No. 752,245.

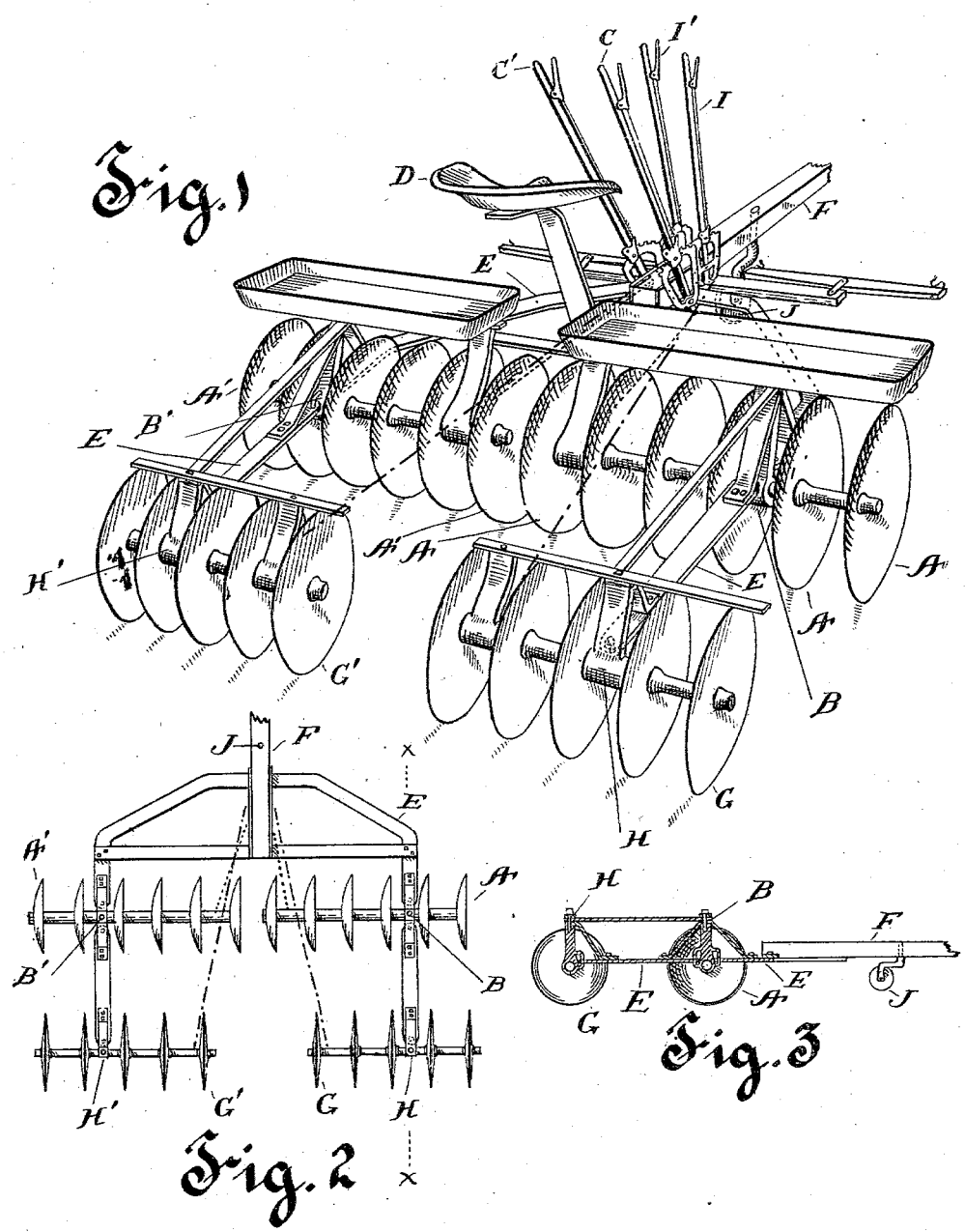

Patented February 16, 1904.

UNITED STATES PATENT OFFICE.

PHILIP H. McVICAR, OF LIVERMORE, CALIFORNIA.

DISK HARROW.

SPECIFICATION forming part of Letters Patent No. 752,245, dated February 16, 1904.

Application filed April 11, 1903. Serial No. 152,284. (No model.)

*To all whom it may concern:*

Be it known that I, PHILIP H. McVICAR, a citizen of the United States, residing at Livermore, in the county of Alameda and State of California, have invented certain new and useful Improvements in Disk Harrows; and I do hereby declare the following to be a full, clear, and exact description of the invention, such as will enable others skilled in the art to which it appertains to make and use the same.

Generally speaking, my present invention relates to improvements in disk harrows; and it has for its objects to produce a harrow which will possess all the requisites of strength and durability and which will be especially simple in construction and efficient in operation.

The ordinary disk harrow consists of a series of concavo-convex disks which upturn the soil as the device is drawn over the ground. Now it is evident that were the concave faces of all the disks arranged in the same direction the machine would have a tendency to be thrust away from the upturned soil and swing out of a straight line. The usual method of overcoming this side thrust is to arrange the disks so that one half the number face in one direction, while the opposite half face in the opposite direction. This arrangement has very marked objections, as those familiar with the practical manipulation of disk harrow are well aware, for the ground along the line between the inner disk of one half and the corresponding disk of the opposite half of the series is left in a very undesirable state. Now to overcome this objection I have arranged a series of colters in the rear of the disk, and these guide the device in a straight line against any tendency toward a side movement. These colters being positioned in the rear of the machine are away from any danger of fouling or injuring the team, while their action on the guiding of the harrow is greater than if they were placed before or in any other position relative to the disks.

I am enabled to accomplish the above and other results by the means illustrated in the accompanying drawings, in which—

Figure 1 is a perspective view of the complete harrow, and Fig. 2 is a top or plan view of the same. Fig. 3 is a section on the line *x x* of Fig. 2.

Referring now to the above views by letter, A A' represent two opposite series of concavo-convex disks all arranged in the same direction in the matter of like faces and each series pivuted near its outer end at the points B B', respectively. The inner end of each series is adjustably connected to the adjustable handles C C', respectively, while the seat D, framework E, and pole F of the harrow are after the style of disk harrows now generally used.

Directly behind the disks A and A' and carried by the frame E are the two series of colters G and G', pivoted at the points H H' and having their inner free ends connected to the adjustable handles I and I'. For sake of simplicity in the drawings I have represented the connections between levers C C' and disks A A' by means of dotted lines and the connections between levers I I' and colters G G' by means of broken lines. Through the agency of these adjustable levers the influence of the colters on the machine can be adjusted to a nicety.

Just forward of the disks and journaled in the pole F of the harrow is the caster-wheel J, the function of which is manifest.

The manner of pivoting the series of disks and colters to the frame E is readily seen from Fig. 3.

The operation of the disks is well understood by those familiar with this class of implements, and I therefore do not deem it necessary to follow each step and the function of each part; but so far as my specifically-arranged colters are arranged I need simply to say that they enter the soil after it has been turned by the preceding disks and guide the machine, therefore, exactly as a rudder placed at the stern of a boat guides its course.

The construction and arrangement of the several parts of my harrow being thus made known, the advantages of the same will, it is thought, be readily understood.

I have described the best form of construction now used by me; but it will be understood that I intend to cover mechanical equivalents when such are substituted.

What I claim, and desire to secure by Letters Patent, is—

1. In an article of the class described the combination with a series of disks adapted to turn the soil, of a series of colters arranged behind said disks and adapted to travel in said upturned soil and guide said disks substantially as and for the purpose set forth.

2. An article of the class described consisting of a series of disks mounted in a suitable frame, a series of colters behind said disks and mounted in said frame, and means for adjusting the positions of said disks and said colters relative to said frame, said colters being adapted to enter the ground upturned by said disks for the purpose set forth.

3. An article of the class described consisting of a series of disks all facing in the same direction, a series of colters behind said disks, a suitable frame, and independent means for adjusting said disks relative to said frame, and said colters relative to said frame for the purpose set forth.

4. In an article of the class described the combination with a plurality of series of disks adapted to upturn the soil, a plurality of series of colters behind said disks and adapted to enter said upturned soil, and means for adjusting each of said series of disks and colters independent of the other series for the purpose set forth.

In testimony whereof I affix my signature in presence of two witnesses.

PHILIP H. McVICAR.

Witnesses:
D. A. SMITH,
CHAS. E. BECK.